US010934377B2

(12) United States Patent
Lafaquiere et al.

(10) Patent No.: US 10,934,377 B2
(45) Date of Patent: Mar. 2, 2021

(54) PREFORMED CATALYTIC SYSTEM COMPRISING A RARE-EARTH METALLOCENE

(71) Applicant: COMPAGNIE GENERALE DES ETABLISSEMENTS MICHELIN, Clermont-Ferrand (FR)

(72) Inventors: Vincent Lafaquiere, Clermont-Ferrand (FR); Julien Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 93 days.

(21) Appl. No.: 16/320,014

(22) PCT Filed: Jul. 24, 2017

(86) PCT No.: PCT/FR2017/052039
§ 371 (c)(1),
(2) Date: Jan. 23, 2019

(87) PCT Pub. No.: WO2018/020122
PCT Pub. Date: Feb. 1, 2018

(65) Prior Publication Data
US 2019/0263954 A1  Aug. 29, 2019

(30) Foreign Application Priority Data

Jul. 25, 2016 (FR) ........................... 1657101

(51) Int. Cl.
| C08F 4/52 | (2006.01) |
| C08F 4/56 | (2006.01) |
| C08F 236/04 | (2006.01) |
| C08F 236/06 | (2006.01) |
| C08F 210/18 | (2006.01) |
| C07F 3/02 | (2006.01) |
| C07F 17/00 | (2006.01) |
| C08F 110/02 | (2006.01) |
| C08F 236/08 | (2006.01) |
| C07F 5/00 | (2006.01) |

(52) U.S. Cl.
CPC .............. *C08F 210/18* (2013.01); *C07F 3/02* (2013.01); *C07F 5/00* (2013.01); *C07F 17/00* (2013.01); *C08F 110/02* (2013.01); *C08F 236/06* (2013.01); *C08F 236/08* (2013.01); *C08F 2420/01* (2013.01)

(58) Field of Classification Search
CPC .. C08F 4/52; C08F 4/56; C08F 236/04; C08F 236/06; B91J 31/2265
See application file for complete search history.

(56) References Cited

U.S. PATENT DOCUMENTS

| 3,794,604 A | 2/1974 | Throckmorton et al. |
| 2014/0000313 A1 | 1/2014 | Barbazza |
| 2017/0335032 A1 | 11/2017 | McCauley et al. |

FOREIGN PATENT DOCUMENTS

| CN | 101309927 A | 11/2008 |
| WO | 2007054224 A1 | 5/2007 |
| WO | 2013014383 A1 | 1/2013 |
| WO | 201608130 A1 | 5/2016 |

OTHER PUBLICATIONS

International Search Report and Written Opinion regarding Application No. PCT/FR2017/052039 dated Nov. 8, 2017.
Chinese Office Action related to CN 201780045665.6 dated Sep. 23, 2020.

*Primary Examiner* — Caixia Lu
(74) *Attorney, Agent, or Firm* — Dickinson Wright PLLC

(57) ABSTRACT

A catalytic system based at least on a preformation monomer which is ethylene or a mixture of ethylene and of a conjugated diene, on a metallocene of formula $\{P(Cp^1)(Cp^2)Y\}$ or $Cp^3Cp^4Y$ and on an organometallic compound as cocatalyst, Y denoting a group comprising a metal atom which is a rare earth metal, the $Cp^1$, $Cp^2$, $Cp^3$ and $Cp^4$ groups, which are identical or different, being selected from the group consisting of fluorenyl groups, cyclopentadienyl groups and indenyl groups, the groups being substituted or unsubstituted, and P being a group bridging the two $Cp^1$ and $Cp^2$ groups and comprising a silicon or carbon atom, is provided. Such a catalytic system exhibits an improved stability of the catalytic activity over time, in particular on storage.

26 Claims, No Drawings

PREFORMED CATALYTIC SYSTEM COMPRISING A RARE-EARTH METALLOCENE

This application is a 371 national phase entry of PCT/FR2017/052039 filed on 24 Jul. 2017, which claims benefit of French Patent Application No. 16/57101, filed 25 Jul. 2016, the entire contents of which are incorporated herein by reference for all purposes.

BACKGROUND

1. Technical Field

The present invention relates to a preformed catalytic system based on rare earth metal metallocenes, which system can be used in particular in the polymerization of monomers, such as conjugated dienes, ethylene, α olefins and their mixtures. The invention also relates to a process for the preparation of the said catalytic system and to its use in the synthesis of polymers.

2. Related Art

Catalytic systems based on rare earth metal metallocenes are known: they are, for example, described in Patent Applications EP 1 092 731, WO 2004035639 and WO 2007054224 on behalf of the Applicant Companies, to be used in the polymerization of monomers, such as conjugated dienes, ethylene and α olefins. They are the reaction products of a lanthanide metallocene and of a cocatalyst in a hydrocarbon solvent. These catalytic systems, thus formed, have the disadvantage of experiencing a decrease in their catalytic activity on storage. In order to guarantee the specifications of the polymer to be synthesized, it is then necessary, in the polymerization process, to compensate for the fluctuations in the catalytic activity of the catalytic system which result from its storage. This compensation involves the readjustment of the parameters of the polymerization process, such as the respective amounts of the monomers and of the catalytic system. It follows that a phase of adjustment of the parameters of the polymerization process and a phase of stabilization of the polymerization device are required before the device is in a position to produce the polymer to specification. The adjustment and stabilization phases have the effect of reducing the productive output of the production device and of complicating the behaviour thereof.

Nevertheless, some of these catalytic systems are of advantage in so far as they make it possible to access ethylene and 1,3-butadiene copolymers of novel microstructure, as a result of the formation of cyclic units in the copolymer chain, which copolymers are of advantage for being used in rubber formulations for the tyre application, as described in Patent Application WO 2014114607 on behalf of the Applicant Companies. It is thus of advantage to find a solution for improving the stability over time of the catalytic activity of these catalytic systems, in particular the stability on storage.

SUMMARY

The Applicant Companies, continuing their efforts, have discovered a catalytic system based on a rare earth metal metallocene exhibiting an improved stability of the catalytic activity on storage, which makes it possible to solve the abovementioned problems encountered. The catalytic system according to the invention has the distinguishing feature of being a catalytic system of "preformed" type.

Thus, a first subject-matter of the invention is a catalytic system based at least:
- on a preformation monomer which is ethylene or a mixture of ethylene and of a conjugated diene,
- on a metallocene of formula (Ia) or (Ib),
- on an organometallic compound as cocatalyst, $$\{P(Cp^1)(Cp^2)Y\} \qquad (Ia)$$

$$Cp^3Cp^4Y \qquad (Ib)$$

Y denoting a group comprising a metal atom which is a rare earth metal, $Cp^1$, $Cp^2$, $Cp^3$ and $Cp^4$, which are identical or different, being selected from the group consisting of fluorenyl groups, cyclopentadienyl groups and indenyl groups, the groups being substituted or unsubstituted, P being a group bridging the two $Cp^1$ and $Cp^2$ groups and comprising a silicon or carbon atom.

The invention also relates to a process for preparing the catalytic system in accordance with the invention.

The invention also relates to a process for the preparation of a polymer which comprises the polymerization of a monomer in the presence of the catalytic system in accordance with the invention.

DETAILED DESCRIPTION OF EXAMPLE EMBODIMENTS

In the present description, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "based on" used to define the constituents of the catalytic system is understood to mean the mixture of these constituents, or the product of the reaction of a portion or of all of these constituents with one another.

In the present patent application, metallocene is understood to mean an organometallic complex, the metal of which, in the case in point the rare-earth metal atom, is bonded to two $Cp^3$ and $Cp^4$ groups or to a ligand molecule consisting of two $Cp^1$ and $Cp^2$ groups connected together by a bridge P. These $Cp^1$, $Cp^2$, $Cp^3$ and $Cp^4$ groups, which are identical or different, are selected from the group consisting of fluorenyl groups, cyclopentadienyl groups and indenyl groups, it being possible for these groups to be substituted or unsubstituted. It should be remembered that rare earth metals denote the elements scandium, yttrium and the lanthanides, the atomic number of which varies from 57 to 71.

The catalytic system in accordance with the invention has the essential characteristic of being a catalyst preformed from ethylene or a mixture of ethylene and of a conjugated diene. In other words, the preformation monomer is ethylene or a mixture of ethylene and of a conjugated diene. When the preformation monomer is a mixture of ethylene and of a conjugated diene, the molar fraction of ethylene in the preformation monomer can vary to a large extent, in particular within a range extending from 0.01 to less than 1. The conjugated diene of use in the preformation can be a conjugated diene having from 4 to 8 carbon atoms, is preferably a 1,3-diene, more preferably 1,3-butadiene or isoprene. The preformation monomer is preferably used according to a (preformation monomer/metal of the metallocene) molar ratio ranging from 5 to 1000, preferably from 10 to 500.

According to a first alternative form of the invention, the metallocene used as base constituent in the catalytic system in accordance with the invention corresponds to the formula (Ia):

{P(Cp¹)(Cp²)Y}  (Ia)

in which:
Y denotes a group comprising a metal atom which is a rare earth metal,
Cp¹ and Cp², which are identical or different, are selected from the group consisting of fluorenyl groups, cyclopentadienyl groups and indenyl groups, the groups being substituted or unsubstituted,
P is a group bridging the two Cp¹ and Cp² groups and comprising a silicon or carbon atom.

According to a second alternative form of the invention, the metallocene used as base constituent in the catalytic system in accordance with the invention corresponds to the formula (Ib):

Cp³Cp⁴Y  (Ib)

in which:
Y denotes a group comprising a metal atom which is a rare earth metal,
Cp³ and Cp⁴, which are identical or different, are selected from the group consisting of fluorenyl groups, cyclopentadienyl groups and indenyl groups, the groups being substituted or unsubstituted.

Mention may be made, as substituted cyclopentadienyl, fluorenyl and indenyl groups, of those substituted by alkyl radicals having from 1 to 6 carbon atoms or by aryl radicals having from 6 to 12 carbon atoms or else by trialkylsilyl radicals, such as SiMe₃ radicals. The choice of the radicals is also guided by the accessibility to the corresponding molecules, which are the substituted cyclopentadienes, fluorenes and indenes, because the latter are commercially available or can be easily synthesized.

Mention may in particular be made, as substituted fluorenyl groups, of 2,7-di(tert-butyl)fluorenyl and 3,6-di(tert-butyl)fluorenyl. Positions 2, 3, 6 and 7 respectively denote the positions of the carbon atoms of the rings, as is represented in the diagram below, position 9 corresponding to the carbon atom to which the bridge P is attached.

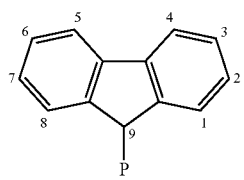

Mention may in particular be made, as substituted cyclopentadienyl groups, of those substituted in the 2 position, more particularly the tetramethylcyclopentadienyl group. Position 2 (or 5) denotes the position of the carbon atom which is adjacent to the carbon atom to which the bridge P is attached, as is represented in the diagram below.

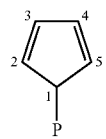

Mention may in particular be made, as substituted indenyl groups, of those substituted in the 2 position, more particularly 2-methylindenyl or 2-phenylindenyl. Position 2 denotes the position of the carbon atom which is adjacent to the carbon atom to which the bridge P is attached, as is represented in the diagram below.

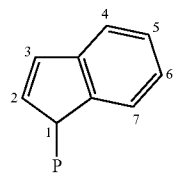

According to a preferred embodiment of the invention, Cp¹ and Cp² are identical and are selected from the group consisting of substituted fluorenyl groups and the unsubstituted fluorenyl group of formula $C_{13}H_8$.

The catalytic system according to this preferred embodiment has the distinguishing feature of resulting in copolymers of butadiene and ethylene which comprise, in addition to the ethylene monomer units and butadiene units, cyclic 1,2-cyclohexane units of following formula:

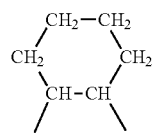

Advantageously, Cp¹ and Cp² are identical and each represent an unsubstituted fluorenyl group of formula $C_{13}H_8$, represented by the symbol Flu.

According to a preferred embodiment of the invention, the symbol Y represents the group Met-G, with Met denoting a metal atom which is a rare earth metal and with G denoting a group comprising the borohydride BH₄ unit or denoting a halogen atom X selected from the group consisting of chlorine, fluorine, bromine and iodine. Advantageously, G denotes chlorine or the group of formula (II):

$(BH_4)_{(1+y)}$-$L_y$-$N_x$  (II)

in which:
L represents an alkali metal selected from the group consisting of lithium, sodium and potassium,
N represents a molecule of an ether,
x, which is or is not an integer, is equal to or greater than 0,
y, which is an integer, is equal to or greater than 0.

Any ether which has the ability to complex the alkali metal, in particular diethyl ether and tetrahydrofuran, is suitable as ether.

According to any one of the embodiments of the invention, the metal of the metallocene of use for the requirement of invention, in the case in point the rare earth metal, is preferably a lanthanide, the atomic number of which ranges from 57 to 71, more preferably neodymium, Nd.

The bridge P connecting the $Cp^1$ and $Cp^2$ groups preferably corresponds to the formula $ZR^1R^2$, in which Z represents a silicon or carbon atom and $R^1$ and $R^2$, which are identical or different, each represent an alkyl group comprising from 1 to 20 carbon atoms, preferably a methyl. In the formula $ZR^1R^2$, Z advantageously denotes a silicon atom, Si.

According to a particularly preferred embodiment, the metallocene is the (dimethylsilyl)bisfluorenylneodymium borohydride of formula (III):

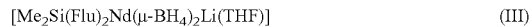

[Me$_2$Si(Flu)$_2$Nd(μ-BH$_4$)$_2$Li(THF)] (III)

in which Flu represents the $C_{13}H_8$ group.

Another base constituent of the catalytic system in accordance with the invention is the cocatalyst capable of activating the metallocene with regard to the polymerization, in particular in the polymerization initiation reaction. The cocatalyst is, in a well-known way, an organometallic compound. The organometallic compounds capable of activating the metallocene, such as organomagnesium, organoaluminium and organolithium compounds, may be suitable.

The cocatalyst is preferably an organomagnesium compound, that is to say a compound with exhibits at least one C—Mg bond. Mention may be made, as organomagnesium compounds, of diorganomagnesium compounds, in particular dialkylmagnesium compounds, and of organomagnesium halides, in particular alkylmagnesium halides. The diorganomagnesium compound exhibits two C—Mg bonds, in the case in point C—Mg—C; the organomagnesium halide exhibits one C—Mg bond. More preferably, the cocatalyst is a diorganomagnesium compound.

According to a particularly preferred embodiment of the invention, the cocatalyst is an organometallic compound comprising an alkyl group bonded to the metal atom.

Alkylmagnesium compounds, very particularly dialkylmagnesium compounds, or alkylmagnesium halides, such as, for example, butyloctylmagnesium and butylmagnesium chloride, are particularly suitable as cocatalyst, also known as alkylating agent. The cocatalyst is advantageously butyloctylmagnesium.

The cocatalyst is used according to a (cocatalyst/metal of the metallocene) molar ratio preferably ranging from 0.5 to 20, more preferably from 1 to 10.

According to any one of the embodiments of the invention, the catalytic system preferably comprises a hydrocarbon solvent. The catalytic system can be provided in the form of a solution when it is in the presence of a hydrocarbon solvent. The hydrocarbon solvent can be aliphatic, such as methylcyclohexane, or aromatic, such as toluene. The hydrocarbon solvent is preferably aliphatic, more preferably methylcyclohexane. Generally, the catalytic system is stored in the form of a solution in the hydrocarbon solvent before being used in polymerization. It is then possible to speak of catalytic solution which comprises the catalytic system and the hydrocarbon solvent.

When the catalytic system is in solution, its concentration is defined by the content of metallocene metal in the solution. The concentration of metallocene metal has a value preferably ranging from 0.0001 to 0.05 mol/l, more preferably from 0.001 to 0.03 mol/l.

Very advantageously, the metallocene which constitutes the catalytic system in accordance with the invention is of formula (Ia).

Another subject-matter of the invention is the preparation of the catalytic system described above.

The process for the preparation of the catalytic system in accordance with the invention comprises the following stages a) and b):
a) reacting, in a hydrocarbon solvent, the cocatalyst and the metallocene,
b) reacting the preformation monomer with the reaction product from stage a).

The metallocene used for the preparation of the catalytic system can be in the form of a crystalline or non-crystalline powder, or else in the form of single crystals. The metallocene can be provided in a monomer or dimer form, these forms depending on the method of preparation of the metallocene, as for example is described in Application WO 2007054224 A2. The metallocene can be prepared conventionally by a process analogous to that described in the documents EP 1 092 731, WO 2007054223 and WO 2007054224, in particular by reaction, under inert and anhydrous conditions, of the salt of an alkali metal of the ligand with a rare earth metal salt, such as a rare earth metal halide or borohydride, in a suitable solvent, such as an ether, for example diethyl ether or tetrahydrofuran, or any other solvent known to a person skilled in the art. After reaction, the metallocene is separated from the reaction by-products by the techniques known to a person skilled in the art, such as filtration or precipitation from a second solvent. In the end, the metallocene is dried and isolated in the solid form.

Stage a) correspond to the stage of activation, also commonly known as alkylation, of the metallocene by the cocatalyst; stage b) corresponds to the stage of preformation of the catalytic system.

The hydrocarbon solvent used in the preparation of the catalytic system is generally an aliphatic or aromatic hydrocarbon solvent, such as, for example, methylcyclohexane or toluene. Generally, it is identical to the solvent of the catalytic solution defined above. This is because the hydrocarbon solvent used in the preparation of the catalytic system is, preferably, also the solvent of the catalytic solution.

In stage a), the cocatalyst is generally added to the hydrocarbon solvent, followed by the metallocene. Stage a) generally takes place at a temperature ranging from 20° C. to 80° C. The reaction time of stage a) is preferably between 5 and 60 minutes and more preferably varies from 10 to 20 minutes.

Stage b) is generally carried out at a temperature ranging from 40° C. to 120° C., preferably from 40° C. to 90° C. The reaction time of stage b) typically varies from 0.5 hour to 24 hours, preferably from 1 h to 12 h. In stage b), the preformation monomer is added to the reaction product from stage a).

Stage b) can be followed by a degassing stage c) in order to remove the preformation monomer which has not reacted during stage b).

Like any synthesis carried out in the presence of an organometallic compound, the synthesis takes place under anhydrous conditions under an inert atmosphere, both for stage a) and for stage b) and, if appropriate, stage c). Typically, the reactions are carried out starting from anhydrous solvents and monomers under anhydrous nitrogen or argon. Stages a), b) and c) are generally carried out with stirring.

Before being used, for example, in polymerization, the catalytic system thus obtained in solution can be stored under an inert atmosphere, for example under nitrogen or argon, in particular at a temperature ranging from −20° C. to ambient temperature (23° C.).

Another subject-matter of the invention is a process for the preparation of a polymer which comprises the polymerization of a monomer M in the presence of the catalytic system in accordance with the invention. The monomer M is to be distinguished from the preformation monomer used in the preparation of the catalytic system in stage b): the monomer M may or may not be identical to the monomer used in stage b). The monomer M is preferably selected from the group of the monomers consisting of conjugated dienes, ethylene, α olefins and their mixtures. Conjugated dienes which are very particularly suitable are 1,3-dienes preferably having from 4 to 8 carbon atoms. More preferably, the monomer M is a 1,3-diene preferably having from 4 to 8 carbon atoms, in particular 1,3-butadiene or isoprene, or else a mixture of 1,3-butadiene and ethylene.

According to the microstructure and the length of the polymer chains prepared by the process in accordance with the invention, the polymer can be an elastomer.

The polymerization is preferably carried out in solution, continuously or batchwise. The polymerization solvent can be an aromatic or aliphatic hydrocarbon solvent. Mention may be made, as example of polymerization solvent, of toluene and methylcyclohexane. The monomer M can be introduced into the reactor containing the polymerization solvent and the catalytic system or, conversely, the catalytic system can be introduced into the reactor containing the polymerization solvent and the monomer. The monomer and the catalytic system can be introduced simultaneously into the reactor containing the polymerization solvent, in particular in the case of a continuous polymerization. The polymerization is typically carried out under anhydrous conditions and in the absence of oxygen, in the optional presence of an inert gas. The polymerization temperature generally varies within a range extending from 40° C. to 150° C., preferably 40° C. to 120° C. It is adjusted according to the monomer to be polymerized.

The polymerization can be halted by cooling the polymerization medium. The polymer can be recovered according to conventional techniques known to a person skilled in the art, such as, for example, by precipitation, by evaporation of the solvent under reduced pressure or by steam stripping.

The abovementioned characteristics of the present invention, and also others, will be better understood on reading the following description of several exemplary embodiments of the invention, given by way of illustration and without limitation.

EXEMPLARY EMBODIMENTS

1—Characterization of the Polymers by Size Exclusion Chromatography (SEC)

a) Principle of the Measurement:

Size exclusion chromatography or SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standard products and the polydispersity index (PI=Mw/Mn) can be calculated via a "Moore" calibration.

b) Preparation of the Polymer:

There is no specific treatment of the polymer sample before analysis. It is simply dissolved in tetrahydrofuran+0.1 vol % of distilled water at a concentration of approximately 1 g/l. The solution is then filtered through a filter with a porosity of 0.45 μm before injection.

c) SEC Analysis:

The apparatus used is a Waters Alliance chromatograph. The elution solvent is tetrahydrofuran, the flow rate is 0.7 ml/min, the temperature of the system is 35° C. and the analytical time is 90 min. A set of four Waters columns in series, with the Styragel HMW7, Styragel HMW6E and two Styragel HT6E trade names, is used.

The volume of the solution of the polymer sample injected is 100 The detector is a Waters 2410 differential refractometer and the software for making use of the chromatographic data is the Waters Empower system.

The calculated average molar masses are relative to a calibration curve produced from PSS ReadyCal Kit commercial polystyrene standards.

2—Preparation of Catalytic Systems in Accordance with the Invention: Examples 1 to 11

The catalytic systems C1-C11 in accordance with the invention are prepared according to the following procedure.

The cocatalyst butyloctylmagnesium (BOMAG) and then the metallocene [Me$_2$Si(Flu)$_2$Nd(μ-BH$_4$)$_2$Li(THF)] are added, in the contents shown in Table I, to a reactor containing the hydrocarbon solvent methylcyclohexane (MCH) or toluene (Tol). The activation time is 10 minutes and the reaction temperature is 20° C. (stage a)). Subsequently, the preformation monomer, which is ethylene (Eth), a mixture of ethylene and of 1,3-butadiene (Eth/Bde) or a mixture of ethylene and of isoprene (Eth/Iso), is introduced into the reactor in the proportions shown in Table I, the molar fraction of ethylene in the mixtures of ethylene and of 1,3-butadiene or of ethylene and of isoprene being 0.8. The preformation reaction takes place at a temperature shown in Table I, for a period of time also shown in Table I. In Example 4, on conclusion of stage b), the reactor is degassed and flushed with nitrogen in order to remove the unconverted preformation monomer. The metallocene can be prepared according to the procedure described in Patent Application WO 2007054224.

3—Preparation of Catalytic Systems not in Accordance with the Invention: Examples 12 to 14

The catalytic system CE1-1 not in accordance with the invention is prepared according to the process disclosed in Patent Application WO 2007054224 and described below:

The cocatalyst, the butyloctylmagnesium (BOMAG) and then the metallocene [Me$_2$Si(Flu)$_2$Nd(μ-BH$_4$)$_2$Li(THF)] are added, in the contents shown in Table II, to a reactor containing toluene (Tol). The activation time is 10 minutes and the reaction temperature is 20° C. Its preparation conditions appear in Table II.

The catalytic system CE1-2 not in accordance with the invention is prepared in a similar way to the catalytic system CE1-1 except for the solvent, which is methylcyclohexane.

The catalytic system CE1-3 not in accordance with the invention is prepared according to the following procedure:

The cocatalyst, the butyloctylmagnesium (BOMAG) and then the metallocene [Me$_2$Si(Flu)$_2$Nd(μ-BH$_4$)$_2$Li(THF)] are added, in the contents shown in Table II, to a reactor containing the hydrocarbon solvent methylcyclohexane (MCH). The activation time is 1 h and the reaction temperature is 60° C.

The catalytic systems CE1-1, CE1-2 and CE1-3 are not in accordance with the invention due to the absence of the preformation stage (stage b)). These are catalytic systems known from the state of the art, in particular from Patent Application WO 2007054224. The catalytic systems CE1-1 and CE1-2 are formed "in situ": in other words, the activation reaction takes place directly in the solvent which will serve as polymerization solvent; the monomers to be polymerized are then added to the polymerization solvent containing the catalytic system formed in situ. For CE1-3, the constituents of the catalytic system CE1-3 are mixed in the presence of a solvent in which the activation reaction takes place to form a catalytic solution comprising 0.01 mol/l of metallocene; it is this catalytic solution which is added to the polymerization solvent. This catalytic solution does not contain preformation monomers.

4—Conditions for Storage of the Catalytic Systems

Unless otherwise indicated, the catalytic systems C1 to C11 in accordance with the invention are stored immediately after their preparation in bottles which are hermetically closed under a nitrogen atmosphere at −20° C. for C1 to C8 and C10 to C11 and at 23° C. for C9. For the study of the stability of the catalytic activity on storage of a catalytic system in accordance with the invention, bottles which are hermetically closed under nitrogen containing the catalytic systems C3, C4, C6 and C7 are also stored at 23° C.

The catalytic systems CE1-1 and CE1-2 not in accordance with the invention are not stored and are used immediately for the polymer synthesis in order to determine their catalytic activities.

The catalytic system CE1-3 not in accordance with the invention, if it is not used at once in the polymer synthesis, is stored immediately after its preparation in bottles which are hermetically closed under a nitrogen atmosphere at 23° C.

5—Stability of the Catalytic Activities of the Catalytic Systems: Examples 15 to 28

The catalytic systems C3, C4, C6, C7, C9 and CE1-3 are used in polymerization without having been stored after their synthesis or after having been stored at ambient temperature (23° C.) for variable periods of time. The catalytic activities of the catalytic systems C3, C4, C6, C7 and C9 and CE1-3 are determined, according to whether or not they have been stored, under the polymerization conditions described below.

The polymerization is carried out at 80° C. and an initial pressure of 4 bar in a 500-ml glass reactor containing 300 ml of polymerization solvent, methylcyclohexane, the catalytic system (47 μmol of neodymium metal) and the monomers, the monomers 1,3-butadiene and ethylene being introduced in the form of a gas mixture containing 20 mol % of 1,3-butadiene. All the tests were carried out with a total BOMAG content of 5 molar equivalents, with respect to the neodymium, which resulted, in some tests, in a supplementary addition of BOMAG to the reactor at the same time as the catalytic system. The polymerization reaction is halted by cooling, degassing the reactor and adding 10 ml of ethanol. An antioxidant is added to the polymer solution. The copolymer is recovered by vacuum drying in an oven. The weight weighed makes it possible to determine the mean catalytic activity of the catalytic system, expressed in kilograms of copolymer synthesized per mole of neodymium metal and per hour (kg/mol·h).

The results for catalytic activity according to the storage time and the storage temperature of the catalytic system in solution appear in Table III.

It is observed that the catalytic activities of the catalytic systems C3, C4, C6 and C7, which are preformed with a mixture of ethylene and of 1,3-butadiene, before or after storage for at least 20 days. Even storage of the catalytic system C6 at 23° C. for more than 85 days has no effect in significantly decreasing its catalytic activity. The catalytic system C9, which is preformed with ethylene alone, also exhibits a stable catalytic activity after storage at 23° C. for more than 20 days.

On the other hand, it is observed that the catalytic system CE1-3 not in accordance with the invention does not exhibit a catalytic activity which is as stable on storage at 23° C. This is because the catalytic system CE1-3 exhibits a decline in catalytic activity of more than 20% after only 10 days of storage at 23° C.

The maintenance of the catalytic activity over a long period makes it possible to use one and the same manufacturing batch of a catalytic system in accordance with the invention over this same period without having to carry out, during this period, phases of readjustment of the parameters of the polymerization process and of rendering the polymerization device stable again, while guaranteeing the specifications of the polymer to be synthesized.

6—Comparison of the Catalytic Activities of the Catalytic Systems in Accordance with the Invention with Those of the Catalytic Systems of the State of the Art: Examples 15 to 28 and P1 to P9

The catalytic systems in accordance with the invention and the catalytic systems not in accordance with the invention are each used in the polymerization of a mixture of ethylene and 1,3-butadiene according to the procedure described below.

The polymerization is carried out at 80° C. and an initial pressure of 4 bar in a 500-ml glass reactor containing 300 ml of polymerization solvent, methylcyclohexane or toluene, the catalytic system (47 μmol of neodymium metal) and the monomers, the monomers 1,3-butadiene and ethylene being introduced in the form of a gas mixture containing 20 mol % of 1,3-butadiene. All the tests were carried out with a total BOMAG content of 5 molar equivalents, with respect to the neodymium, which resulted, in some tests, in a supplementary addition of BOMAG to the reactor at the same time as the catalytic system.

The polymerization reaction is halted by cooling, degassing the reactor and adding 10 ml of ethanol. An antioxidant is added to the polymer solution. The copolymer is recovered by vacuum drying in an oven. The weight weighed makes it possible to determine the mean catalytic activity of the catalytic system, expressed in kilograms of copolymer synthesized per mole of neodymium metal and per hour (kg/mol·h).

The mean catalytic activities calculated for each of the catalytic systems appear in Tables III and IV.

Examples 17 to 28 and P1 to P6 are in accordance with the invention as they employ a catalytic system in accordance with the invention (C1 to C11).

Examples 15 and 16 and P7 to P9 are not in accordance with the invention as they employ a catalytic system of the state of the art (CE1-1, CE1-2 and CE1-3).

It should be noted that, for a given polymerization hydrocarbon solvent, methylcyclohexane, the catalytic activities of the catalytic systems C1 to C6 and C8 to C11 are of the same order of magnitude as those of the catalytic systems of the state of the art (CE1-1 or CE1-2).

Finally, the catalytic systems in accordance with the invention can be synthesized both in aromatic solvent (toluene, Example 7) and in aliphatic solvent (methylcyclohexane, Example 6), without their catalytic activities being affected. This is because the catalytic activity of C7 (Example 24) is comparable to that of C6 synthesized in an aliphatic hydrocarbon solvent, methylcyclohexane (Example 22).

TABLE IV

| Examples | Catalytic system | Polymerization solvent | Activity (kg/mol · h) |
|---|---|---|---|
| P1 | C1 | MCH | 148 |
| P2 | C2 | MCH | 132 |
| P4 | C8 | MCH | 176 |
| P5 | C10 | MCH | 154 |
| P6 | C11 | MCH | 123 |
| P7 | CE1-1 | MCH | 159 |
| P8 | CE1-2 | MCH | 135 |
| P9 | CE1-3 | MCH | 109 |

The invention claimed is:

1. A catalytic composition comprising at least:

a preformation monomer which is ethylene or a mixture of ethylene and of a conjugated diene, an organometallic compound as cocatalyst, and

TABLE I

| Examples | Metallocene (mol/l) | Cocatalyst (mol/l) | Hydrocarbon solvent | Preformation time (h) | Preformation temperature (° C.) | Preformation monomer | Preformation monomer/metal Nd molar ratio | Catalytic system |
|---|---|---|---|---|---|---|---|---|
| Ex. 1 | 0.005 | 0.011 | MCH | 5 | 40 | Eth/Bde | 60 | C1 |
| Ex. 2 | 0.005 | 0.025 | MCH | 1 | 80 | Eth/Bde | 60 | C2 |
| Ex. 3 | 0.005 | 0.011 | MCH | 1 | 80 | Eth/Bde | 60 | C3 |
| Ex. 4 | 0.005 | 0.011 | MCH | 1 | 80 | Eth/Bde | 60 | C4 |
| Ex. 5 | 0.005 | 0.0025 | MCH | 1 | 80 | Eth/Bde | 60 | C5 |
| Ex. 6 | 0.02 | 0.044 | MCH | 1 | 80 | Eth/Bde | 60 | C6 |
| Ex. 7 | 0.02 | 0.044 | Toluene | 1 | 80 | Eth/Bde | 60 | C7 |
| Ex. 8 | 0.005 | 0.011 | MCH | 5 | 40 | Eth | 200 | C8 |
| Ex. 9 | 0.02 | 0.044 | MCH | 1 | 80 | Eth | 60 | C9 |
| Ex. 10 | 0.02 | 0.044 | MCH | 5 | 40 | Eth | 60 | C10 |
| Ex. 11 | 0.02 | 0.044 | MCH | 1 | 80 | Eth/Iso | 85 | C11 |

TABLE II

| Examples | Metallocene (mol/l) | Cocatalyst (mol/l) | Hydrocarbon solvent | Activation time (min) | Activation temperature (° C.) | Polymerization solvent | Catalytic system |
|---|---|---|---|---|---|---|---|
| Ex. 12 | 0.0001 | 0.0008 | Toluene | 10 | 20 | Toluene | CE1-1 |
| Ex. 13 | 0.0001 | 0.0008 | MCH | 10 | 20 | MCH | CE1-2 |
| Ex. 14 | 0.01 | 0.022 | MCH | 60 | 60 | MCH | CE1-3 |

TABLE III

| Examples | Catalytic system | Storage time (days) | Storage temperature | Polymerization solvent | Activity (kg/mol · h) | Mn (kg/mol) | PI |
|---|---|---|---|---|---|---|---|
| Ex. 15 | CE1-3 | 0 | — | MCH | 141 | 54.6 | 1.45 |
| Ex. 16 | CE1-3 | 10 | 23 | MCH | 109 | 55.4 | 1.50 |
| Ex. 17 | C3 | 0 | — | MCH | 128 | 69.4 | 1.45 |
| Ex. 18 | C3 | 27 | 23 | MCH | 130 | 58.4 | 1.30 |
| Ex. 19 | C4 | 0 | — | MCH | 108 | 81 | 1.75 |
| Ex. 20 | C4 | 27 | 23 | MCH | 112 | 72.3 | 1.40 |
| Ex. 21 | C6 | 0 | — | MCH | 116 | 74.2 | 1.50 |
| Ex. 22 | C6 | 32 | 23 | MCH | 138 | 59 | 1.30 |
| Ex. 23 | C6 | 85 | 23 | MCH | 112 | 58.1 | 1.30 |
| Ex. 24 | C7 | 0 | — | MCH | 148 | 67.5 | 1.35 |
| Ex. 25 | C7 | 31 | 23 | MCH | 132 | 66.3 | 1.35 |
| Ex. 26 | C7 | 85 | 23 | MCH | 129 | 61.5 | 1.35 |
| Ex. 27 | C9 | 0 | — | MCH | 141 | 59.6 | 1.30 |
| Ex. 28 | C9 | 20 | 23 | MCH | 141 | 73.2 | 1.50 | a metallocene of formula (Ia) or (Ib):

$$\{P(Cp^1)(Cp^2)Y\} \qquad (Ia)$$

$$Cp^3Cp^4Y \qquad (Ib)$$

Y denoting a group comprising Met-G, with Met denoting a rare earth metal and G denoting a group comprising the borohydride $BH_4$ unit or denoting a halogen atom X selected from the group consisting of chlorine, fluorine, bromine and iodine, $Cp^1$, $Cp^2$, $Cp^3$ and $Cp^4$, which are identical or different, being selected from the group consisting of fluorenyl groups, cyclopentadienyl groups and indenyl groups, the groups being substituted or unsubstituted, and P being a group bridging the two $Cp^1$ and $Cp^2$ groups and comprising a silicon or carbon atom.

2. A catalytic composition according to claim 1, wherein the cocatalyst is an organomagnesium compound.

3. A catalytic composition according to claim 1, wherein the cocatalyst is an organometallic compound comprising an alkyl group bonded to the metal atom.

4. A catalytic composition according to claim 1, wherein the cocatalyst is a dialkylmagnesium compound or an alkylmagnesium halide.

5. A catalytic composition according to claim 1, in wherein $Cp^1$ and $Cp^2$ are identical and are selected from the group consisting of substituted fluorenyl groups and the unsubstituted fluorenyl group of formula $C_{13}H_8$.

6. A catalytic composition according to claim 1, wherein $Cp^1$ and $Cp^2$ each represent an unsubstituted fluorenyl group of formula $C_{13}H_8$.

7. A catalytic composition according to claim 1, wherein G denotes chlorine or the group of formula (II): $(BH_4)_{(1+y)}\text{-}L_y\text{-}N_x$ (II), wherein: L represents an alkali metal selected from the group consisting of lithium, sodium and potassium, N represents a molecule of an ether, x is equal to or greater than 0, and y is an integer equal to or greater than 0.

8. A catalytic composition according to claim 1, wherein the rare earth metal is a lanthanide, the atomic number of which varies from 57 to 71.

9. A catalytic composition according to claim 1, wherein the rare earth metal is neodymium Nd.

10. A catalytic composition according to claim 1, wherein the bridge P corresponds to the formula $ZR^1R^2$, Z representing a silicon or carbon atom and $R^1$ and $R^2$, which are identical or different, each representing an alkyl group comprising from 1 to 20 carbon atoms.

11. A catalytic composition according to claim 10, wherein Z is Si.

12. A catalytic composition according to claim 1, wherein the metallocene is the (dimethylsilyl)bisfluorenylneodymium borohydride of formula (III): $[Me_2Si(Flu)_2Nd(\mu\text{-}BH_4)_2Li(THF)]$ (III) Flu representing the $C_{13}H_{18}$ group.

13. A catalytic composition according to claim 1, wherein the conjugated diene is a 1,3-diene.

14. A catalytic composition according to claim 13, wherein the conjugated diene is 1,3-butadiene or isoprene.

15. A catalytic composition according to claim 1, wherein the molar ratio of the preformation monomer to the metal of the metallocene has a value ranging from 5 to 1000.

16. A catalytic composition according to claim 1, wherein the molar ratio of cocatalyst to the metal of the metallocene has a value ranging from 0.5 to 20.

17. A catalytic composition according to claim 1, which catalytic composition comprises a hydrocarbon solvent.

18. A catalytic composition according to claim 17, wherein the hydrocarbon solvent is aromatic or aliphatic.

19. A catalytic composition according to claim 17, wherein the molar concentration of metal of the metallocene in the catalytic solution has a value ranging from 0.0001 to 0.05 mol/l.

20. A catalytic composition according to claim 1, wherein the metallocene is of formula (Ia).

21. A process for the preparation of a catalytic composition defined in claim 1, which comprises the following stages:
   a) reacting, in a hydrocarbon solvent, the cocatalyst and the metallocene, and
   b) reacting the preformation monomer with the reaction product from stage a).

22. A process according to claim 21, wherein stage a) takes place at a temperature ranging from 20° C. to 80° C. and stage b) is carried out at a temperature ranging from 40° C. to 120° C.

23. A process for the preparation of a polymer which comprises the polymerization of a monomer M in the presence of a catalytic composition defined in claim 1, in which the monomer M is selected from the group of the monomers consisting of conjugated dienes, ethylene, α-olefins and their mixtures.

24. A process according to claim 23, wherein the monomer M is at least one of a 1,3-diene and isoprene.

25. A process according to claim 23, wherein the monomer M is 1,3-butadiene or a mixture of 1,3-butadiene and ethylene.

26. A process according to claim 23, wherein the polymer is an elastomer.

* * * * *